United States Patent [19]

Orlowski

[11] 4,114,902
[45] Sep. 19, 1978

[54] SEALING RINGS

[75] Inventor: David Chester Orlowski, Rock Island, Ill.

[73] Assignee: Inpro, Inc., Rock Island, Ill.

[21] Appl. No.: 840,374

[22] Filed: Oct. 7, 1977

[51] Int. Cl.² .............................................. F16J 15/44
[52] U.S. Cl. ...................................................... 277/53
[58] Field of Search .................................... 277/53-57

[56] References Cited

U.S. PATENT DOCUMENTS

| | | | |
|---|---|---|---|
| 2,981,490 | 4/1961 | Conley | 277/53 |
| 3,927,890 | 12/1975 | Adams | 277/53 |
| 4,022,479 | 5/1977 | Orlowski | 277/53 |

Primary Examiner—Robert I. Smith
Attorney, Agent, or Firm—Y. Judd Azulay

[57] ABSTRACT

There is disclosed improved sealing rings having two complementary parts. The sealing rings are used on the shafts of rotating elements. The first ring has an annular face with a recess therein and adapted and constructed to mate with an axially extending flange which extends from the annular face of the second ring. The flange has grooves on the radially outwardly facing surface. The inwardly facing wall of the recess also possesses grooves. Additionally, there is a communicating orifice through the first ring to communicate with the recess. The various grooves are designed to accumulate foreign particles that may be incursive with respect to the journalling means of a driving or driven device. These foreign particles are then expelled through the aforementioned orifice due to centrifugal forces while the device is being employed.

7 Claims, 5 Drawing Figures

SEALING RINGS

BACKGROUND OF THE INVENTION

The present invention is deemed to be a considerable and meritorious improvement over the invention disclosed in U.S. Pat. No. 4,022,479.

It bears reiteration at this juncture to state that in most industries, it is extremely important that there be provided a seal for bearings that supports rotating shafts which prevent the lubricants associated with the bearings from leaking externally of an associated housing or bearing support and for preventing foreign particles in the environment while the shaft is being used from working themselves through the seal and into the lubricant for the bearings.

The aforementioned patent incorporates a disclosure wherein there is taught a sealing ring structure which has as an object, the elimination the movement of the lubricant from the bearings outside of the housing. The sealing ring structure as disclosed, also assists in eliminating the movement of foreign particles into the bearing area and lubricant area within the housing.

It was therein disclosed a sealing structure that is composed of two rings, preferably metal, one of which is fixed to the housing and the other of which is fixed to rotate with the shaft. The ring that is fixed to the housing has a labyrinth-type of seal against the shaft which discourages the lubricant from moving outside of the housing along the shaft. In the prior patent, a joint was provided between the two rings which is composed of an annular recess in the first ring that opens axially outwardly of the housing and an annular flange on the adjoining outer ring that fits within the aforementioned annular recess of the first ring. The construction of the annular recess and the annular flange were said to be constructed so that the two bearing rings that are rotating relative to one another, will tend not to bind or create a heated frictional disposition between them. There was also provided in the first sealing ring a hole that communicates to the aforementioned recess. In the embodiment taught in the prior patent, the annular flange of the second sealing ring had notches cut therein. With such an arrangement, foreign particles that moved into the joint formed by the recess and flanges were scraped by the notches in the flanges to the hole where they were discharged back into the atmosphere or the area surrounding the housing. It will be noted that the first ring is, of course, fixed to the housing and the second ring is, of course, adapted to rotate with the shaft by suitable sealing means. However, in both instances, there is no movement between the respective sealing rings and the portion it is fixed to which would normally create wear if the opposite occurred.

SUMMARY OF THE INVENTION

The invention of the present matter is an ingenious improvement over the device disclosed in the aforementioned patent. The improvement, among other items, includes the use of at least one groove on the mating flange with respect to the recess on the other complementary ring. Additionally, the inwardly facing wall of the recess also contains at least one groove. The grooves act to inhibit particle migration, regardless of relative peripheral speed of the rotating rings and provide a circumferential path for the exclusion of foreign particles even in the event of zero relative rotation.

DESCRIPTION OF THE PREFERRED EMBODIMENT

Figure 1:
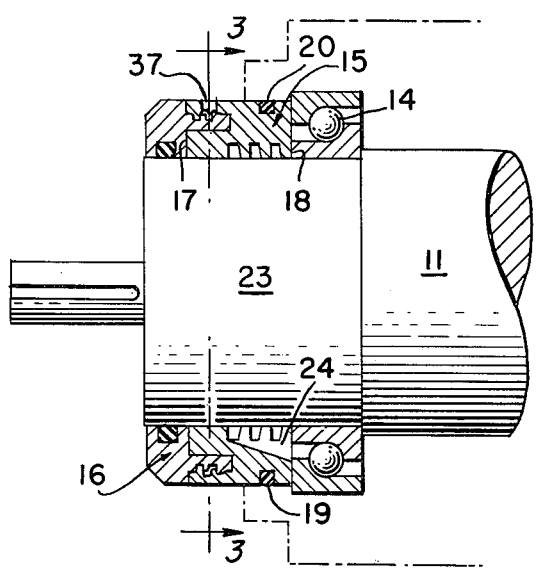
FIG. 1 is a vertical sectional view showing the improved sealing structure with a ball bearing shaft.

Referring first to FIG. 1, there is shown an arrangement in which the sealing structure of the present invention may be employed. There is shown the sealing rings of the present invention in vertical cross-section mounted on a shaft 11. The shaft is provided with a bearing housing 12 shown in dotted lines in partial outline form. Conventional race 13 with ball bearings, 14 are conventionally journalled to the shaft 11. Conventional means is provided to provide lubricant to the race 13. More details of this feature can be discerned from the aforementioned U.S. Pat. No. 4,022,479, which is herein incorporated by reference.

Figure 4:
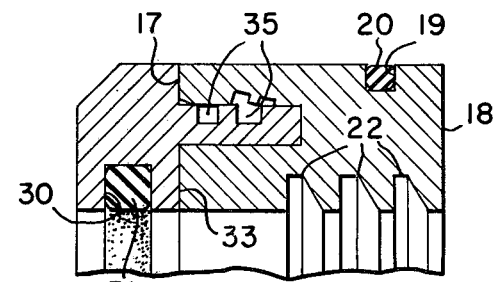
FIG. 4 is an enlarged partial vertical section of the sealing rings of the present invention.
Figure 5:
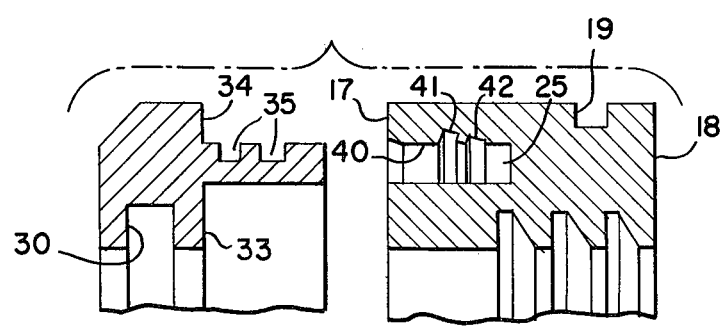
FIG. 5 is an enlarged exploded partial sectional view of the sealing rings of the present invention.

In order to prevent leakage of the lubricant from inside the housing 12 outwardly and the leakage of foreign particles from outside the housing into the bearings or lubricant, there is provided a sealing ring structure composed of a first ring 15 and a mating second ring 16. The first ring 15 has axially opposite ends, 17 and 18, facing internally of the housing 12 and externally of the said housing respectively. The first ring 15 also possesses an external annular groove 19 in which seats a conventional O-ring 20 that bears against a complementary circular opening in the housing 12, see especially FIGS. 4 and 5. The first ring 15 is secured against rotation with respect to the housing 12 by a swedge fit with respect thereto. Three inwardly extending radial grooves 22 are provided on the inner surface of the first ring 15 and provide radial shoulders which engage lubricant tending to move axially outwardly along the shaft portion 23 and to guide it into an axially extending groove 24 on the inside of the first ring 15. The groove 24 joins together the annular grooves 22 to carry the lubricant caught in the grooves 22 to carry the said lubricant back into the housing 12.

The external end 17 of the first ring 15 is provided with an annular recess 25 that extends axially from the said external end 17 and serves one part of the joint with the second ring 16. The second ring 17 fits around the shaft portion 23 and possesses an internal annular groove 30 that is fitted with a conventional O-ring 31, see especially FIGS. 4 and 5. The frictional engagement of the O-ring 31 between the second ring 16 and the shaft portion 23 causes the second ring 16 to be fixed to rotate with the shaft 23. The O-ring also limits axial movement of the second ring 16 on the shaft portion 23. Furthermore, the second ring is provided with an annular flange 32 that is complementary to and fits within the aforementioned axial recess 25. The flange 32 extends axially from inner and outer radial faces 33 and 34 that are positioned alongside the external end 17 of the first ring 15.

Figure 2:
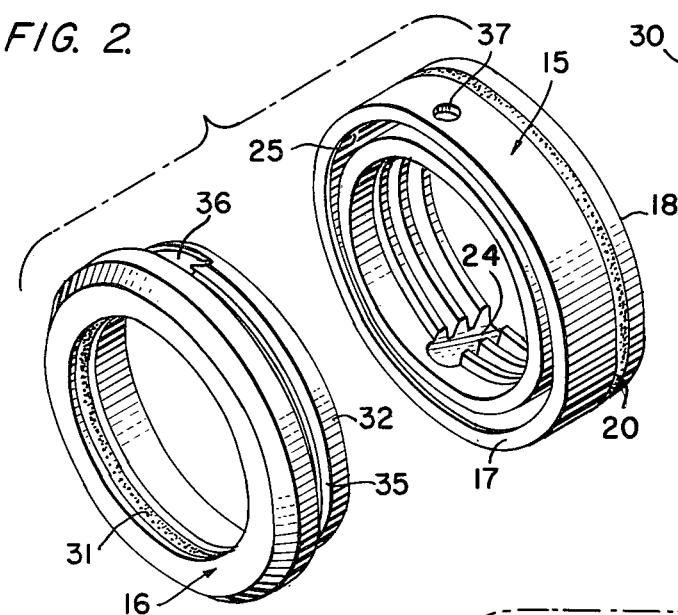
FIG. 2 is an exploded perspective view of the parts of the sealing rings of the present invention.
Figure 3:
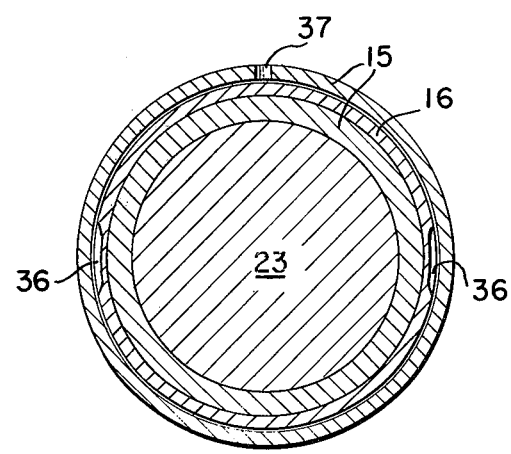
FIG. 3 is a vertical sectional view taken along line 3—3 of FIG. 1.

The annular flange 32 is provided with a pair of outwardly radially extending grooves 35, each having walls and a bottom perpendicular to one another. Additionally, on the same radially outwardly extending surface possessing the groove 35, there is provided a pair of diametrically opposite depressions 36 that are sufficiently large to connect each of the two grooves 35; see especially FIGS. 2 and 3.

A hole 37 is provided externally of the first ring 15 which extends to the recess 25.

It should also be known that the radial dimension of the flange 32 is from 0.005 inches to 0.015 inches smaller than the radial dimension of the recess 25. Consequently, the second ring 16 is permitted to rotate within the recess with practically zero friction between the respective surfaces.

A particular feature of the present improved sealing rings is the fact that the inwardly radially facing wall 40 of the recess 25 posses a first groove 41 and disposed axially there behind a shallower groove 42. Both grooves have walls which are parallel to each other and at an angle whereby if imaginary radial lines were extended from the walls as continuations thereof from diametrically opposite locales, they would intersect axially outwardly externally in the direction of second ring 16 when the rings are assembled. Each of the bottoms of the said grooves are perpendicular to the walls thereof. Furthermore, the two grooves 41 and 42 are smaller in axial dimension than either of the grooves 35. They are located on wall 40 whereby they are opposite the axially outermost groove 35 of flange 32, that is, as furthermost from inner and outer radial faces 33 and 34.

Should foreign particles find their way into the junction of the first ring 15 and second ring 16, such particles must move around the adjoining outer surface of the annular flange 32 and will accumulate in the aforementioned grooves. However, particles in these locations in the grooves will be communicated to the opening 37 where the particles will gravitate due to the centrifugal action. The grooves on the flange 32 are designed to catch any particles while the grooves on wall 40 of the recess 25 are designed to be the distributor to the opening 37.

As was mentioned in the issued patent, that while O-rings are provided for seals, there is little or no relative rotation between the sealing surfaces of the O-rings. Therefore, the O-rings should not wear and the possibility of breaking the seal is remote.

What is claimed is:

1. Sealing rings comprising:
   (a) a first ring member;
   (b) a second ring member;
   (c) said first ring member having a first radially extending face and a second radially extending face;
   (d) said second radially extending face having an annular axially extending recess having parallel inner and outer walls;
   (e) said second ring member having an axially extending annular flange having an outwardly facing portion and an inwardly facing portion adapted and constructed to be complementary with said recess;
   (f) said flange having at least one annular groove along the outwardly facing portion;
   (g) said outer wall of said recess having at least one annular groove; and
   (h) an opening from said groove of said outer wall communicating radially and externally of said first ring member.

2. The sealing rings of claim 1 wherein said annular grooves on said flange is two in number and at least one depression is located on the flange to thereby connect the said two grooves.

3. The sealing rings of claim 2 wherein the said depression are two in number and are diametrically opposite to one another.

4. The sealing rings of claim 3 wherein said annular grooves on said outer wall is two in number.

5. The sealing rings of claim 4 wherein the two grooves of the outer wall are dimensioned and positioned to be in confrontation with respect to the outermost groove of said flange.

6. The sealing rings of claim 5 wherein the innermost groove of the outer wall is shallower than the one located outermost.

7. The sealing rings of claim 6 wherein the walls of said grooves of said outer wall are parallel to each other and are at an acute angle with respect to a radial line of said rings and the bottom of each groove is perpendicular to the said walls.

* * * * *